Figure 1:
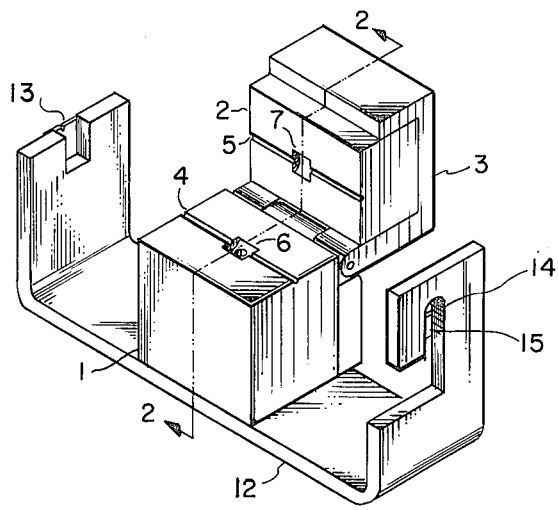

Aug. 10, 1965   A. M. LIPSKI   3,199,339

GAGING OF MOVING ELONGATED BODIES

Filed Aug. 1, 1963

INVENTOR.
ANTHONY MATTHEW LIPSKI
BY
ATTORNEY 3,199,339
GAGING OF MOVING ELONGATED BODIES
Anthony Matthew Lipski, Easthampton, Mass., assignor to United Elastic Corporation, Easthampton, Mass., a corporation of Massachusetts
Filed Aug. 1, 1963, Ser. No. 299,273
7 Claims. (Cl. 73—37.7)

The present application is, in part, a continuation of my co-pending application, Serial No. 192,187, filed May 3, 1962, now abandoned.

This invention relates to a gauge for determining continuously the dimensions of rapidly moving, continuous, elongated bodies such as a thread, ribbon or the like.

The gauging of continuously moving elongated bodies such as threads or ribbons presents a serious practical problem. It is encountered in its most serious form in connection with threads, ribbons or other structures which are extruded continuously. Extrusion rates must be fairly high in order to achieve economical production and often the products produced at one stage or other in their manufacture are of limited tensile strength. For example, when an elastic thread is produced by extrusion of rubber latex, spandex and similar materials the filament when first formed, may not have as high tensile strength as is ultimately achieved. For example, the extruded thread may be only partially set or cured when it is first formed. Sometimes it may be subjected to further processing which completes the setting or curing but it is often necessary to know, or to monitor continuously, the dimensions of the thread even at a stage where it has not achieved its ultimate tensile strength. Similar problems arise with textile threads for example, nylon threads which have not been stretched to achieve their ultimate high tensile strength. Such threads are sometimes shipped in this form or even made into fabrics or articles where maximum elongation under sudden stresses is important. For example, certain seat belts or seat harnesses and particularly certain connections to parachutes and the like are desirably made so that they can elongate a considerable amount on an initial shock and absorb the shock so as to reduce possibilities of injury. There are many other situations in which it is necessary to monitor the dimensions of threads, ribbons or the like in a stage where they cannot achieve their ultimate tensile strength.

These special situations have been referred to because the problem of dimensional gauging is much more serious than with threads or ribbons which have achieved their ultimate tensile strength, for example spun threads of silk, cotton, wool, etc. The present invention has its greatest advantage in gauging materials which have not reached their ultimate strength. This is not to say that the invention is not just as operative and just as useful in gauging elongated bodies which have reached their final tensile strength but the problem is not quite as acute and so the advantages obtained by the present invention are not as great.

It has been proposed to use mechanical gauges with openings or micrometer jaws set to very close tolerances. Such mechanical gauging has achieved great practical success in ribbons of parallel elastic threads where the gauge stops the winding machine if oversized material increases the friction in passing through the gauge and moves it to actuate a switch to stop the machine. Such a device is described and claimed in the copending application of Kelsey and Liberty, Serial No. 181,098, now Patent No. 3,166,172, filed March 20, 1962. Similar mechanical gauges have not proven suitable for the continuous monitoring of individual threads because if the mechanical gauge opening is set sufficiently close so that precise monitoring of dimensions is achieved the friction when oversized material is encountered will often break a thread. This is particularly serious when it is necessary to monitor the dimensions of threads or other elongated bodies continuously where the material has not achieved ultimate tensile strength. Also the Kelsey and Liberty type of device is primarily useful where a machine must be stopped in order to cut out a defective section of material. Often it is important to monitor dimensions without stopping the machine so that, if necessary continuous adjustments in the machine may be made. In such cases mechanical gauges have either had so much clearance that they do not measure precisely or present problems of catching and breaking the material. Another serious drawback to the mechanical gauge is that it can determine only one thing, namely whether a material has become sufficiently oversized to actuate the gauge. In many cases it is desirable also to determine when the size has become too small and the mechanical type of gauge is inherently unsuited to performing this type of function.

It has been proposed in the past in U.S.P. No. 2,560,883 to Mennesson to gauge moving material pneumatically. This is effected by means of a chamber with relatively short orifices or conduits at each end, the orifices being aligned. Fairly stiff material to be gauged such as a wire or wick is threaded through the orifices and should be only a very little smaller in cross-section than the orifices themselves. Not only are the orifices quite short with respect to the dimensions of the wire or wick which is threaded through them but they are also quite short with respect to the chamber in the ends of which they are formed. A compressed gas, such as compressed air is introduced into the chamber at its center through a suitable flow meter orifice and escapes through the two chamber orifices between the wick or wire and the orifice walls. Depending on the size of the wire or wick, more or less compressed air flows out through the chamber orifices and there is a greater or less pressure drop across the flow meter orifice. This actuates a gauge which in the patent is of the liquid bubble column type, but may be any suitable gauge of adequate sensitivity. The pneumatic gauge just described has an advantage over the mechanical gauge in that it is possible to obtain indications when it is under as well as oversized which is the only indication obtainable with the mechanical gauge. There is also the advantage that the measurement is continuous and somewhat oversized material, provided that it is not bigger than the orifice dimensions, can continue to move through the measuring device without stopping its movement which is often necessary with mechanical gauges of the Kelsey and Liberty type.

While the Mennesson pneumatic gauge does have an advantage over the mechanical gauge it has a number of shortcomings. First of all the accuracy of measurement is drastically restricted by the necessarily very short length of the two orifices. Small changes in cross-section of the wick or wire passing through the gauge will result in wide variations of gauge pressure. The accuracy is adequate for certain wicks and though less adequate, the gauge is still operable with wires. However, there are two extremely serious practical drawbacks to the gauge which makes it useless for the gauging of rapidly moving fine threads or ribbons such as extruded spandex threads or ribbons. Also the gauge cannot be used with materials which have to be introduced into the gauge when both ends are held. Thus it cannot be used at all on the spandex thread or ribbon which is already passing between rollers, spools and the like.

The reason for the inapplicability and other limitations is that it is difficult or impossible to thread a very flexible extruded thread or ribbon through the gauge chamber orifices. If the gauge chamber is very small and the orifices very short and very near together it is theoretically possible to thread a flexible material through them. Practically however, this is a difficult procedure and renders the operation of the gauge unecomonical. Also the shorter the orifice conduit length the greater the inaccuracy of measurement particularly over a variation of size of any considerable extent. Of course the gauge cannot be used at all where the moving thread or ribbon is already moving between two elements which hold its ends, such as a pair of rollers and a winding spool.

The present invention constitutes an improvement on the Mennesson pneumatic gauge which can be used to give accurate measurements even with very flexible threads and which can be used with threads that are already attached at each end. The improved gauge permits more accurate measurement and is usable with materials held at each end where the former gauge cannot be used at all. Essentially in the present invention two blocks are provided with aligned faces and means for bringing them into contact. In the face of each block there is a channel which is very long in comparison to the cross-section of the thread to be gauged, in a typical instance from ten to one hundred times as long, and the center between long channels is enlarged to provide a small and short chamber. When the two blocks are brought together the channels line up and form a conduit with a small center chamber. Into the chamber through one block there is introduced compressed gases, such as compressed air.

The actual principal of gauging is the same as in the Mennesson pneumatic gauge with shorter orifices and a solid block which has been described above. That is to say there is a measurement of flow of the compressed air or gases between the walls of the long conduits and the material to be gauged. This flow is measured by a very sensitive gauge which may be of any desired type, even the liquid type of the earlier patent, but is preferably a sensitive mechanical gauge with suitable indicating meter which preferably is calibrated in terms of thread size.

Because the blocks can be separated from each other, preferably by a suitable hinged frame holding the upper block, a moving thread or ribbon can be lifted up and snapped into the groove in the lower block and then the upper block brought down to form the measuring conduit. All of this can be effected while the ribbon is moving and of course is unaffected by the fact that the ends of the thread are being held.

While it is possible to hold the two blocks in contact by other means such as latches, this is normally undesirable if the gauge is to be used with a series of threads, for example, forty or more threads, which may be moving in the same direction in the production of extruded spandex or other extruded thread.

Theoretically gravity could be used to hold the two blocks together if the upper block were sufficiently massive and heavy. This is not excluded but it is not preferred. In the preferred form the block are strongly magnetized and may be made either of hard steel or other suitable alloy capable of being highly magnetized. By this means it is possible with blocks of very moderate size and weight to hold them firmly together with sufficient force to assure complete accuracy of measurement. Magnetic blocks therefore constitute the preferred modification of the present invention and are used in most practical gauges, particularly for operation where there are a number of strands.

Reference has been made to a thread and a round conduit. The gauging of thread such as spandex, polyethylene and polypropylene threads is perhaps the most important single field of utility of the present gauge. However, it may be used for ribbons or other uniform shapes, of course with the proper modification in shape of the channels in the blocks. It is possible to use a block with more than one channel, for example, to gauge two or more threads which are moving closely parallel to each other. This, however, involves a certain degree of complexity and it is normally preferable to use single channels blocks although a number of them can be operated from the same flow metered source of compressed gas. Provisions must of course then be made for directing the flow of gas to the particular block on which a measurement is being made.

Reference has been made to the blocks being in frameworks which is practically necessary in order to insure precise alignment of the channels to form the final conduit. With the preferred magnetic blocks it is necessary to observe a precaution, namely that the framework must not itself be a ferromagnetic material as otherwise the magnetism holding the blocks together is reduced. This presents no problem as there are many very suitable materials such as stainless steel, brass and the like which are entirely devoid of ferromagnetism.

If the threads or ribbons being gauged have completely nonabrasive surfaces the blocks with the channels work perfectly. Unfortunately however, in many cases it is customary and in fact often necessary to apply finely divided solids such as talc and the like to extruded threads to prevent them from sticking together. In such a case severe abrasion may take place at the ends of the channels, unless the thread is parallel to the channels which is not the case with ordinary thread extrusion machines. In the course of weeks or months the gauge loses its accuracy. According to a preferred form of the invention therefore there are provided guides, such as for example, hard ceramic guides, which hold the moving thread substantially parallel as it goes through the gauging conduit. It then rides on a cushion of air and the abrasion problem is completely solved. It is vitally necessary however, that the guides must be of a nature and located so that they do not interfere with placing a moving thread into the channel of a block. This problem and the structural forms it makes necessary will be described below in greater detail when the description of the drawings is made.

In spite of the great advance in range of gauging sizes made possible by the present invention there are limits and in normal use there will be several sizes of blocks, or rather blocks with several sizes of channels, provided for threads or ribbons of different sizes. Here again the preferred modification of the present invention presents an advantage because the guides which prevent abrasion also serve to keep the threads moving through the gauging blocks parallel with no friction. It is therefore unnecessary to mount the blocks in a very rigid mechanism. To an extent therefore the abrasion resisting guides perform an additional function of self alignment or at least elimination of stresses which would upset alignment and which would require correspondingly much more rigid mounting for the blocks. This is an additional advantage of the preferred and more specific aspect of the present invention which is designed to solve the problem presented by abrasion.

Figure 2:
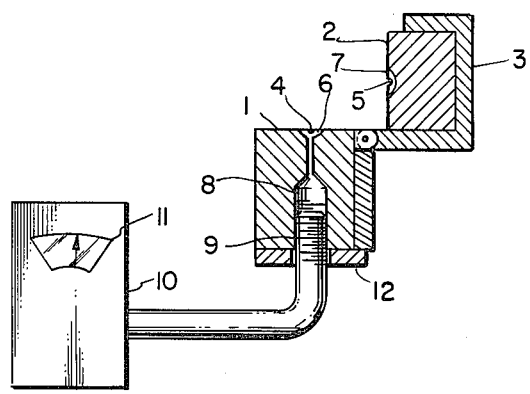

The invention will be described in greater detail in conjunction with the drawings in which:

FIG. 1 is an isometric view of the blocks with channel forming grooves and antiabrasion guides, and FIG. 2 is a cross-section along the line 2—2 of FIG. 1.

Both figures of the drawing show the machine open and provided with a lower block 1 of magnetic material having a groove 4 shaped to form one-half of the gauging channel and an upper block 2 of magnetic material with a corresponding or mating groove 5. The blocks are mounted on a hinged framework 3 of nonferromagnetic material, such as stainless steel, so that when closed the grooves will constitute a continuous gauging channel. Near the center are provided enlarged depressions 6 and 7 in the grooves 4 and 5 respectively which, when the blocks are closed, will define a chamber. It will be noted that the channels 4 and 5 are very long compared to the cross-section in actual practice, from 10 to 100 times, and they are also very long in comparison to the dimensions of the chamber formed by the depressions 6 and 7. In the drawing the channel size is somewhat exaggerated for clarity and would correspond to a very large thread.

The chamber formed by depressions 6 and 7 is connected to a source of compressed gas or fluid through a channel 8 into a threaded chamber 9. To this is connected a compressed air conduit from a differential gauge 10 with a dial face 11. The differential gauge may for example, operate with a pressure of 80 to 84 inches of water to give a very accurate differential. For clarity the connection of the compressed air is shown only in FIG. 2 and not in FIG. 1.

The blocks are mounted on a U shaped framework 12 provided at the left with a groove 13 of hard ceramic. The ceramic material may, if desirable, be cemented in and is replaceable if the groove, after long wear, becomes excessively deepened. On the right, the framework 12 has a higher leg provided with an L shaped slot 14 in which there is mounted another piece of hard ceramic 15 with a guiding groove which however points down instead of up as in the case of the left hand guide 13.

In operation extruded threads, which are continuously passing from a roller to a wind up spool from left to right, are lifted by the operators fingers and snapped into the guide grooves 13 and 15. The framework 3 is then closed and the gauge begins to measure dimensions. The positions of the guide grooves 13 and 15 are arranged for the normal type of extrusion machines in which the threads come from a roller below the middle of the measuring channel and are wound up on a spool which is located at a higher elevation. In other machines where the location of feed roller and take-up spool are different it may be necessary to change the relative positions of the guide grooves 13 and 15 but in each case they align the moving thread so that it passes through the gauging conduit parallel thereto and does not contact its sides being held by the cushion of air as it moves.

As has been mentioned above, the present invention is often used in machines in which a large number of threads are extruded. It is possible by the present invention, with a single or small number of blocks to gauge different threads. Of course when the block is shifted from one thread to another there will be gauging only of the thread actually going through the block. In some cases it is not necessary to have continuous gauging of each thread all of the time and in such case a single set of blocks or a smaller number than the numbers of the threads may be used. If each thread is to be monitored continuously, of course, there must be as many sets of blocks as there are threads. However, it is by no means necessary that each set of blocks have a separate source of compressed air and a separate gauge. Particularly when recorders are used the gauge can be periodically and rapidly shifted from one set of blocks to another so that a series of recording graphs from each thread may be produced. These recorders and their sequential sequence sampling circuits are standard articles of commerce and are therefore not described in detail. In the present specification there are shown only a simply single gauge.

Compressed gases such as compressed air have been described in the operation of the instrument of the present invention. It should be understood that it is possible to use liquids. This permits a wider range of thread sizes gauged in a single channel because of the higher viscosity of liquids. On the other hand there is a very marked lowering of sensitivity as opposed to a gas, such as compressed air, and so for most instruments compressed air will be found to be the best practical compromise.

I claim:
1. A device for gaging continuously the dimensions of a moving elongated body which comprises in combination,
   (a) two blocks with mating faces, each face being provided with an abrasion resistant groove which, mating with the groove on the face of the other block, define a channel the dimensions of which are larger than the largest cross-sectional dimensions of the maximum oversized material to be gaged, an abrasion resistant length of which channel is very large compared to its cross-section,
   (b) a hinged framework in which the two blocks are mounted which permits swinging one block away from the other or bringing them together in mating alignment,
   (c) magnetic means for holding the two blocks in mated position, and
   (d) means for applying fluid under pressure to the channel whereby the fluid flows out the ends of the channel between the material and the channel walls and precision gaging means for determining the rate of flow of the fluid as the material to be gaged moves through the channel.

2. A device according to claim 1 in which the framework is of nonferromagnetic material, the blocks are strongly magnetized and the strong magnetism constitutes the means for holding them together in the mated position.

3. A device according to claim 2 in which the fluid is a compressed gas.

4. A device according to claim 3 in which the channel is provided with an enlarged central chamber which is small in length compared to channel length and the means for introducing the compressed gas is means for introducing it into the center of said central chamber.

5. A device according to claim 1 in which the framework to which the lower block is attached carries means provided with two abrasion resistant wearing grooves aligned with the channel produced when the blocks are in mated position so that the material to be gaged passing through the channel between the grooves need not touch the channel walls.

6. A device according to claim 2 in which the framework to which the lower block is attached carries means provided with two abrasion resistant wearing grooves aligned with the channel produced when the blocks are in mated position so that the material to be gaged passing through the channel between the grooves need not touch the channel walls.

7. A device according to claim 1 in which the framework is provided with two vertical extensions on either side of the lower block, the extension on the side of the block toward which the elongated material moves being provided with an abrasion resistant groove open at the top and the vertical extension on the other side of the lower block provided with an L shaped slot, the bottom of the L facing in the direction of the open side of the lower block an abrasion resistant guide groove held thereby opening on the bottom the abrasion resistant grooves being aligned with the channel so that the material to be gaged passing through the channel between the grooves need not touch the channel walls.

References Cited by the Examiner

UNITED STATES PATENTS

| | | | |
|---|---|---|---|
| 2,051,636 | 8/36 | Gastrich | 33—147 |
| 2,485,553 | 10/49 | Barnes et al. | 242—157 |
| 2,516,932 | 8/50 | Wainwright | 73—37.7 |
| 2,689,098 | 9/54 | Schacklett | 242—157 |
| 2,883,732 | 4/59 | Parnell | 28—64 |

FOREIGN PATENTS

| | | |
|---|---|---|
| 54,104 | 2/47 | France. |
| 442,365 | 2/36 | Great Britain. |

ISAAC LISANN, *Primary Examiner.*